UNITED STATES PATENT OFFICE.

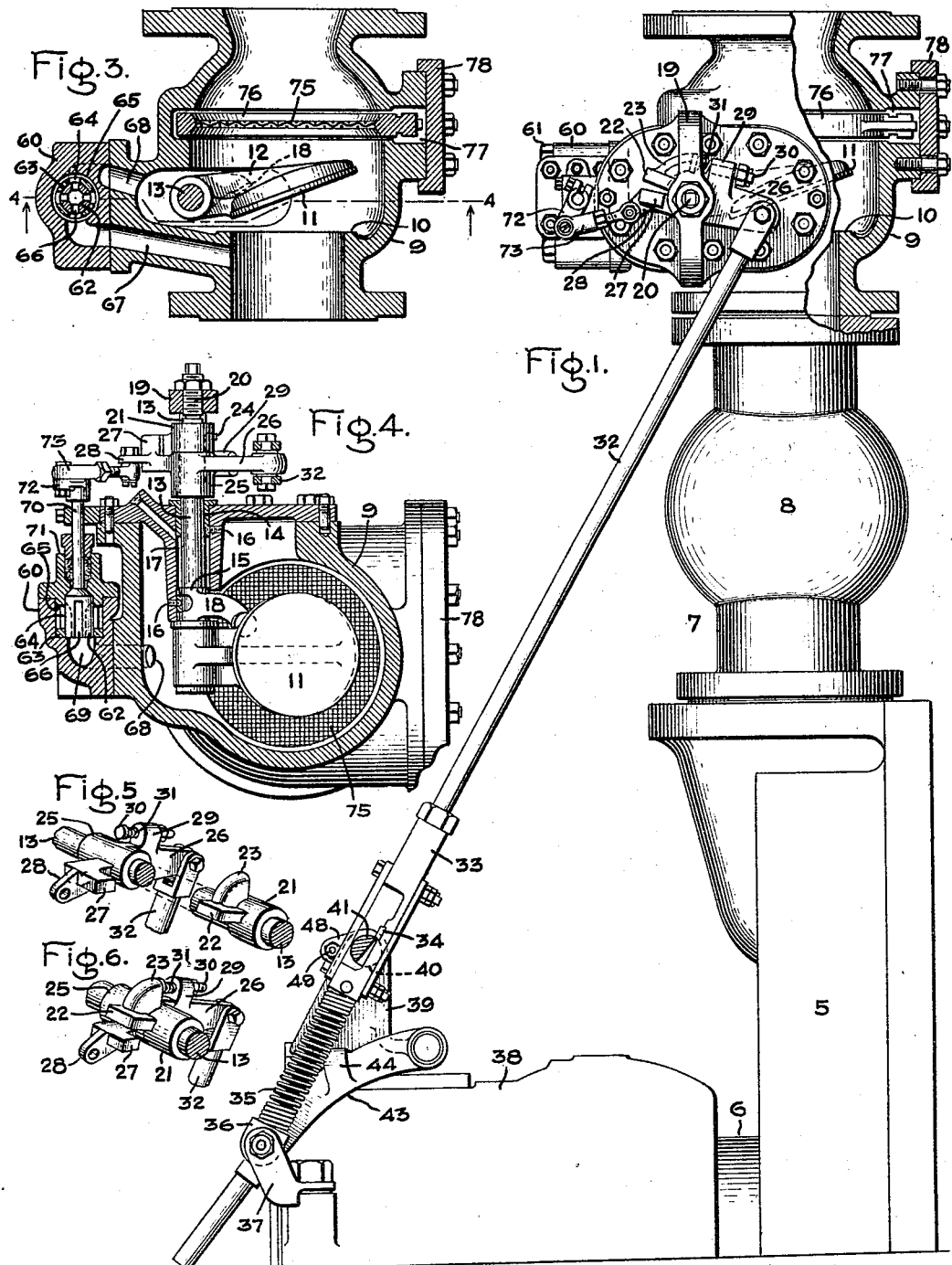

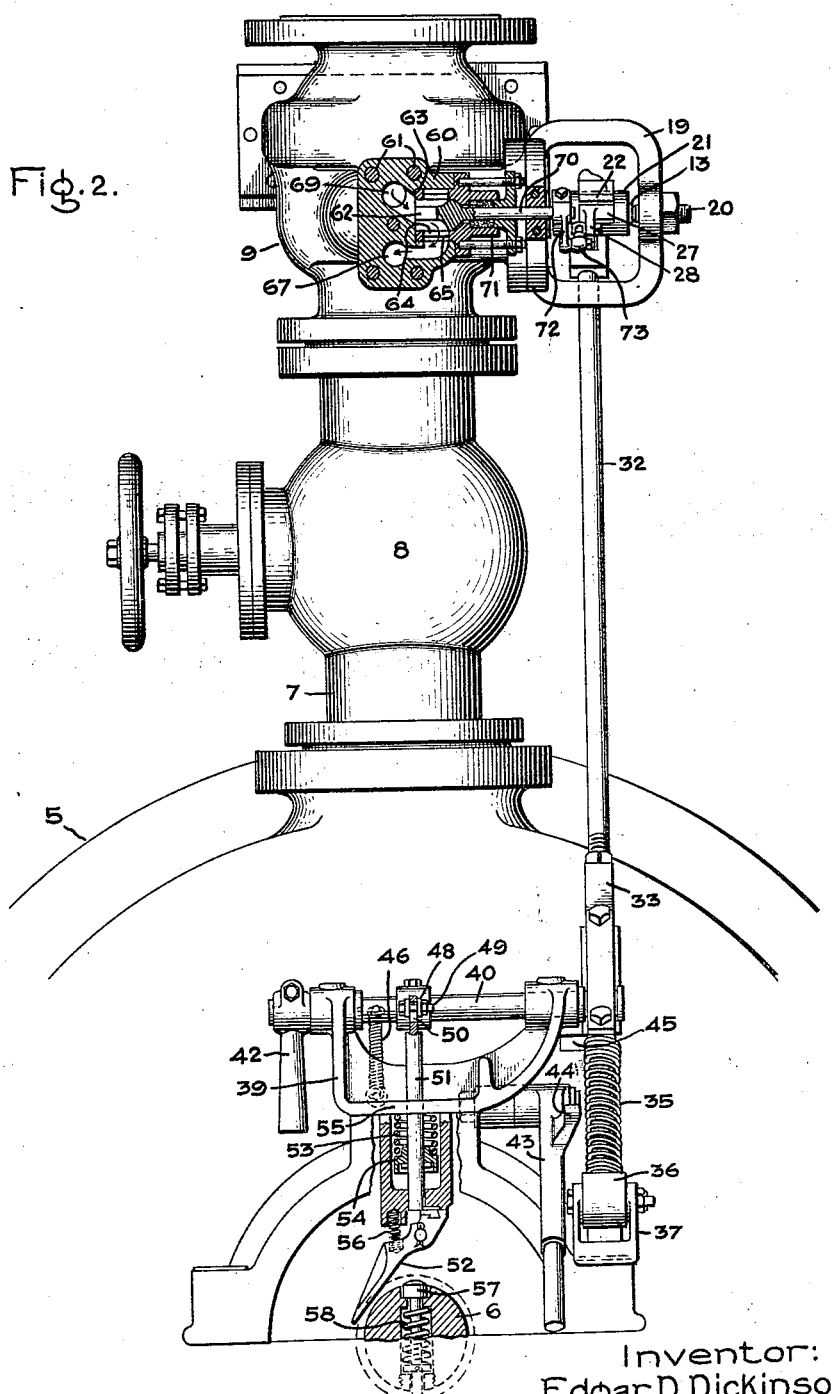

EDGAR D. DICKINSON, OF SCHENECTADY, NEW YORK, ASSIGNOR TO GENERAL ELECTRIC COMPANY, A CORPORATION OF NEW YORK.

VALVE MECHANISM FOR ELASTIC-FLUID TURBINES AND THE LIKE.

1,409,528.        Specification of Letters Patent.        Patented Mar. 14, 1922.

Application filed June 22, 1918. Serial No. 241,315.

*To all whom it may concern:*

Be it known that I, EDGAR D. DICKINSON, a subject of the King of Great Britain, residing at Schenectady, county of Schenectady, State of New York, have invented certain new and useful Improvements in Valve Mechanisms for Elastic-Fluid Turbines and the like, of which the following is a specification.

The present invention relates to valve mechanisms and especially to emergency valve mechanisms which are arranged to quickly and automatically close when tripped due to excess speed of the machine in connection with which they are used or from any other cause.

The object of my invention is to provide an improved valve mechanism which is simple in structure, economical to build and can be relied upon to be positively closed whenever it is tripped.

One particular application of my invention is as an emergency valve mechanism for an elastic fluid turbine and in the following specification it is specifically described in this connection, but it will be understood that it is not necessarily limited thereto.

In the drawing, Fig. 1 is a side elevation partly in section of an emergency valve mechanism embodying my invention; Fig. 2 is an end elevation partly in section of the structure shown in Fig. 1; Fig. 3 is a sectional view of the valve mechanism; Fig. 4 is a section taken on line 4—4, Fig. 3, looking in the direction of the arrows; and Figs. 5 and 6 are perspective views of certain parts.

Referring to the drawing, 5 indicates an elastic fluid turbine having a shaft 6, and 7 indicates a conduit through which elastic fluid is conveyed to the turbine. In conduit 7 is a suitable hand valve 8 for normally controlling the supply of elastic fluid to the turbine and beyond this as regards the flow of elastic fluid is located the emergency valve mechanism which forms the subject matter of the present invention.

The emergency valve mechanism comprises a valve casing 9 in which is a valve seat 10 upon which a valve 11 is adapted to seat. Valve 11 is a simple flapper valve comprising a plate or disk and has an arm 12 by which it is fixed to one end of a shaft 13. Shaft 13 is journaled in two bearing sleeves 14 and 15 which are fixed by pins 16 in the ends of an opening 17 formed at one side of valve casing 9 and formed integral with sleeve 15 is an arm 18 which forms a stop to limit the opening movement of valve 11. Carried by the valve casing 9 adjacent the outer end of shaft 13 is a U-shaped bearing bracket 19 provided with an adjusting screw 20 which forms both a thrust bearing for the end of shaft 13 and a means for adjusting it axially. This is desirable because the inner end of shaft 13 is subjected to the pressure of the elastic fluid in conduit 7 while the outer end is subjected to atmospheric pressure.

On shaft 13 outside the valve casing is fixed a sleeve 21 provided with a flat projecting arm 22 and an abutment 23. Sleeve 21 may be fixed to the shaft by a suitable pin 24 or otherwise. Pivotally mounted on shaft 13 adjacent sleeve 21 is an actuating lever comprising a second sleeve 25 provided on one side with a lever arm 26 and on the opposite side with a flat lever arm 27 having a short projection 28. On lever arm 26 is a lug 29 provided with an opening through which extends a bolt 30 and between the head of bolt 30 and lug 29 is a spring 31. These parts are best illustrated in Figs. 5 and 6. In Fig. 5 they are shown spaced apart so that the structure of each can be readily seen and in Fig. 6 they are shown in their normal position which is with sleeves 21 and 25 close together as shown in Fig. 4. When in normal position the arm 22 is just above lever arm 27 and abutment 23 is in front of the head of bolt 30.

Connected to the end of lever arm 26 is one end of a rod 32, the other end of which is connected to a rectangular frame 33 which carries a catch plate 34. Frame 33 is connected by a spring 35 to a head 36 pivoted to the furcations of a U-shaped bracket 37 which is fixed to the bearing cap 38 of the turbine. On bearing cap 38 is a bracket 39 comprising two arms in the ends of which is pivoted a shaft 40. On one end of shaft 40 is a catch 41 adapted to engage catch plate 34 and on the other end is a handle 42. When catch 41 is in engagement with catch plate 34, as shown in Figs. 1 and 2, valve 11 is held open by the head of bolt 30 engaging abutment 23, the opening movement being limited by stop arm 18. But little force is required for this because the valve when open is substantially balanced. Also lever arm 27 is slightly spaced from projecting arm 22 and spring 35 is under tension. If now catch 41 is moved from engagement with catch plate 34, spring 35 will contract, pulling rod 32 and turning the lever comprising sleeve 25 and arms 26 and 27 on shaft 13. Lever arm 27 will thus be brought into engagement with arm 22 which is fixed on shaft 13 and such shaft will be turned to close valve 11. To open valve 11, rod 32 must be moved to turn lever arm 26 to bring the head of bolt 30 against abutment 23 and so turn shaft 13 and for this purpose a pivoted lever 43 having a projection 44 is provided, the projection being adapted to engage a pin 45 at the lower end of frame 33. When the valve 11 closes the movement of rod 32 and frame 33 brings pin 45 adjacent to projection 44 so that by lifting lever 43 the rod will be forced back again and the valve 11 opened. Connected to shaft 40 is a spring 46 which biases the shaft toward a position where catch 41 will engage catch plate 34 so that when rod 32 is moved to open valve 11 and reaches the end of its movement, catch 41 will automatically drop behind catch plate 34.

The catch 41 may be arranged to be released upon the occurrence of any unusual operating condition. In the present instance it is shown as being adapted to be released manually or to be released automatically whenever the speed exceeds a predetermined value.

On shaft 40 is fixed an arm 48 in the end of which is a bolt 49 which passes through a slot 50 in the flattened upper end of a plunger rod 51. The lower end of plunger rod 51 rests on a pivoted trip finger 52 and is normally pressed downwards by a spring 53 which surrounds plunger rod 51 and at one end engages a collar 54 on plunger rod 51 and at the other end engages a fixed abutment 55. Trip finger 52 is pressed toward a position where it is under plunger rod 51 by a spring 56 and its outer end projects down adjacent to shaft 6. In an opening in shaft 6 is a plunger 57 held by a spring 58 and the arrangement is such that when the speed of the shaft reaches a predetermined high value the plunger 57 will be thrown out by centrifugal force against the action of spring 58 and will engage the end of trip finger 52 and knock it from under plunger rod 51. This releases plunger rod 51 which is forced downward by spring 53 thus turning shaft 40 and releasing catch 41. Plunger 57 and spring 58 are shown only diagrammatically as a speed responsive arrangement of this kind is well known and forms no part of the present invention. The spring 46 normally holds bolt 49 at the top of slot 50 and maintains catch 41 under catch plate 43. With this arrangement it will be clear that the valve mechanism can be tripped manually by turning shaft 40 by means of handle 42, the bolt 49 moving downwards in slot 50, and also that it will be tripped whenever the plunger 57 knocks the trip finger from under plunger rod 51. When this latter occurs, the handle 42 is used for resetting the parts in an obvious manner.

When the valve 11 is closed, the elastic fluid pressure in conduit 7 acts on the upper side of it to hold it closed, and to avoid the necessity of having to open it against this pressure which would be difficult I provide a by-pass valve mechanism by means of which elastic fluid is admitted to the lower side of the valve 11 just prior to opening it to balance the pressure thereon. 60 indicates a by-pass valve casing which is suitably fastened to valve casing 9 by bolts 61, and 62 indicates a by-pass valve which rotates in a cage 63 which forms a seat for valve 62. Cage 63 is in the form of a cylinder provided with longitudinally extending slots 64 and surrounding it is an annular chamber 65. Valve 62 is in the form of a cylinder also and has longitudinally extending slots 66 which are adapted to be brought into and out of registry with slots 64 by turning the valve 62 back and forth on its axis. Valve casing 9 below valve 11 is connected to the annular chamber 65 by a conduit 67 and above valve 11 it is connected by a conduit 68 to a chamber 69 at the end of valve 62, chamber 69 being in communication with the interior of valve 62. Valve 62 has a stem 70 which extends through a stuffing-box 71 and has an operating arm 72 on its end which is connected by a link 73 to the projection 28 on the lever arm 27. When valve 11 is tripped and closed, valve 62 is also closed and shuts off communication between conduits 67 and 68. Upon the first movement of resetting lever 43 to open valve 11, the lever comprising arms 26 and 27 turn on shaft 13 to open by-pass valve 62. This does not cause valve 11 to open but only presses the head of bolt 30 against abutment 23, the valve offering considerable resistance to being opened due to the pressure on its upper surface. When by-pass valve 62 opens, elastic fluid flows from above valve 11 through conduit 68 to chamber 69 and from there through slots 64 and 66 which are now in registry to annular chamber 65 thence by way of conduit 68 to the region below valve 11. The hand valve 8 having been previously closed, the pressure on the two sides of valve 11 will be quickly equalized or at least sufficiently so to permit a further movement of rod 32 to easily open valve 11.

It will be seen that there is in substance a lost motion connection between the actuating lever comprising arms 26 and 27 and the valve 11 and also a cushioning means in the form of the spring pressed bolt 30. When the valve mechanism is tripped, this lost motion connection performs the function of causing the lever arm 27 to give lever arm 22 a sharp-quick blow so that should valve 11 tend to stick open it will be loosened; and when the valve 11 is being opened it performs the function of permitting the opening of the by-pass valve 62 prior to the opening of main valve 11, as already explained.

The purpose of the spring pressed bolt 30 is to cushion the closing movement of valve 11. When actuating arm 27 moves into engagement with arm 22 to close valve 11, bolt 30 is moved away from abutment 23. As valve 11 approaches closed position the elastic fluid pressure builds up rapidly above it, tending to force it closed and since valve 11 is fixed on shaft 13 while the actuating lever is loose thereon, the valve can move faster than and away from the actuating lever. When this occurs, however, abutment 23 strikes the head of bolt 30 and the movement of the valve toward closed position is then cushioned.

In valve casing 9 in advance of valve 11 as regards the direction of flow is located a suitable strainer comprising a screen 75 carried by a ring 76. The strainer is inserted and removed through an opening 77 which is closed by a cover plate 78.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a valve mechanism, the combination of a casing having a seat, a shaft, a valve fixed to the shaft and adapted to engage the seat, a projecting arm fixed on said shaft, an actuating lever pivoted on said shaft and having two spaced parts adapted to engage said arm to open and close the valve, said parts being spaced apart sufficiently far to provide a lost motion connection between them and the projecting arm, and cushioning means carried by one of said parts for cushioning the closing movement of the valve.

2. In a valve mechanism, a casing having a seat, a shaft pivoted in the casing with one end projecting beyond it, a valve fixed to said shaft, an arm fixed on the projecting end of said shaft, an actuating lever pivoted on said end adjacent the arm and having two spaced parts adapted to engage it to open and close the valve, said parts being spaced apart sufficiently far to provide a lost motion connection between them and the arm, and a spring means carried by the part which serves in opening the valve which acts as a cushioning means when the valve closes.

3. In a valve mechanism, the combination of a casing having a seat therein, a valve, an actuator having a lost motion connection with the valve for positively opening and closing it, said actuator being adapted to give the valve a blow to start it toward closed position, a by-pass valve for the first named valve, and means connecting the actuator to the by-pass valve.

4. In a valve mechanism, the combination of a casing having a seat, a shaft, a valve fixed to the shaft and adapted to engage the seat, a projecting arm fixed on said shaft, an actuating lever pivoted on said shaft and having two spaced parts adapted to engage said arm to open and close the valve, said parts being spaced apart sufficiently far to provide a lost motion connection between them and the projecting arm, a by-pass valve, and means connecting the actuating lever to the by-pass valve.

5. In a valve mechanism, the combination of a casing having a seat, a valve pivoted in the casing and adapted to engage the seat, an actuator pivoted to the casing and having a lost motion connection with the valve for positively opening and closing it, a by-pass valve for connecting together the regions on opposite sides of the first named valve, and means connecting the by-pass valve to said actuator, whereby when said actuator is moved it operates the by-pass valve prior to the first named valve.

In witness whereof, I have hereunto set my hand this 20th day of June, 1918.

EDGAR D. DICKINSON.